(12) United States Patent
Montes et al.

(10) Patent No.: US 8,644,825 B2
(45) Date of Patent: Feb. 4, 2014

(54) CUSTOMISATION OF A RADIO COMMUNICATION TERMINAL

(75) Inventors: Jacques Montes, Le Perreux sur Marne (FR); Olivier Beaujard, Paris (FR)

(73) Assignee: Wavecom, Issy-les-Moulineaux Cedex (FR)

( * ) Notice: Subject to any disclaimer, the term of this patent is extended or adjusted under 35 U.S.C. 154(b) by 1151 days.

(21) Appl. No.: 12/375,965

(22) PCT Filed: Jul. 24, 2007

(86) PCT No.: PCT/EP2007/057602
§ 371 (c)(1),
(2), (4) Date: Apr. 22, 2009

(87) PCT Pub. No.: WO2008/015126
PCT Pub. Date: Feb. 7, 2008

(65) Prior Publication Data
US 2009/0312006 A1    Dec. 17, 2009

(30) Foreign Application Priority Data
Aug. 1, 2006  (FR) .................................. 06 07044

(51) Int. Cl.
H04W 4/00    (2009.01)
H04W 4/04    (2009.01)
(52) U.S. Cl.
USPC ................. 455/435.2; 455/435.1; 455/435.3
(58) Field of Classification Search
USPC .................... 455/435.1–435.3, 558
See application file for complete search history.

(56) References Cited

U.S. PATENT DOCUMENTS

| 2002/0154632 | A1 | 10/2002 | Wang et al. |
| 2003/0003933 | A1* | 1/2003 | Deshpande et al. .......... 455/510 |
| 2005/0079863 | A1* | 4/2005 | Macaluso ..................... 455/419 |
| 2005/0113088 | A1* | 5/2005 | Zinn et al. .................. 455/435.2 |
| 2005/0164737 | A1* | 7/2005 | Brown ......................... 455/558 |
| 2005/0227692 | A1* | 10/2005 | Kawashima et al. ...... 455/435.2 |

FOREIGN PATENT DOCUMENTS

WO      00/41409     7/2000

OTHER PUBLICATIONS

French Search Report of counterpart foreign Application No. 06/07044 filed Aug. 1, 2006.
International Preliminary Report on Patentability of counterpart foreign Application No. PCT/EP2007/057602 filed on Jul. 24, 2007.
International Search Report of counterpart foreign Application No. PCT/EP2007/057602 filed on Jul. 24, 2007.

* cited by examiner

*Primary Examiner* — Allahyar Kasraian
(74) *Attorney, Agent, or Firm* — David D. Brush; Westman, Champlin & Koehler, P.A.

(57) ABSTRACT

A method is provided for definitive customization or customization for a predetermined duration related to a subscription of a radio communication terminal possessing an operating mode requiring the association with the terminal of a customization data set specific to a radio communication network, so as to allow the terminal to be linked with the radio communication network. The method includes the following steps: obtaining carrier information pertaining to carriers received by the terminal; and selecting a customization data set for the terminal, from a plurality of customization data sets, as a function of a selection criterion applied to the carrier information obtained.

9 Claims, 2 Drawing Sheets

_CUSTOMISATION OF A RADIO COMMUNICATION TERMINAL_

CROSS-REFERENCE TO RELATED APPLICATIONS

This Application is a Section 371 National Stage Application of International Application No. PCT/EP2007/057602, filed Jul. 24, 2007 and published as WO 2008/015126 on Feb. 7, 2008, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The field of the disclosure is that of radio communications and more particularly radio communication terminals, such as radiotelephones, PDA ("Personal Digital Assistant"), radio communication devices, intended to be embedded for example in machines or vehicles.

More precisely, the disclosure relates to a technique of "identity management" making it possible to customise such devices, during their first use and definitively or for a predetermined duration related to a subscription. Indeed, more and more mobile telephone operators offer users subscription offers with a variable duration (1 year, 2 years, etc.).

The disclosure has in particular applications in the field of M2M (for "machine to machine"), where the machines include radio communication terminals in order to communicate between one another and/or with one or several pieces of equipment (typically a server).

As such, the disclosure applies in particular, but not exclusively, to systems for measuring data remotely, for example on water, gas or electricity meters, and more generally to systems for telemetry or for monitoring orders, wherein each piece of measuring (water meter for example) or distribution (drink distributor for example) equipment is equipped with a radio communication terminal in order to communicate with one or several management servers.

BACKGROUND OF THE DISCLOSURE

In order to simplify the description, we shall limit ourselves, in the rest of this document, to describing the particular case where the radio communication device is a GSM radio communication terminal comprising a SIM card (for "Subscriber Identity Module"). Those skilled in the art will extend this information without difficulty to any other type of radio communication terminal.

Conventionally, a GSM radio communication terminal cannot communicate with the GSM network without a customised SIM card (i.e. without a SIM card with activated customisation data). Indeed, a SIM card is a module comprising all of the data concerning the subscriber, including an IMSI identity number (for "International Mobile Subscriber Identity"), an authentication key Ki, as well as algorithms associated for authenticating the subscriber by the GSM network.

During the customisation of radio communication terminals, it is desired in particular to reconcile at least some of the following objectives:
  simplicity of the manipulations for activating the customisation, the user having to be able to carry out these operations with a reduced number of operations, and with each of these operations able to be the easiest possible;
  security of the customisation data;
  simplicity and low cost in the implementation.

The current technique consists, for a user, in choosing an operator of a public land network (or "PLMN" for "Public Land Mobile Network"), purchasing a SIM card customised in one of the sales outlets of the chosen operator, then inserting the customised SIM card into a radio communication terminal. In this way, the radio communication terminal is customised and can access the network services (PLMN) of the chosen operator.

By way of example, the disadvantages of prior art are discussed hereinafter through the particular case where the GSM radio communication terminal is embedded in an apparatus for measuring data remotely, for example a water meter.

The inventors have observed that the aforementioned current technique has a certain number of disadvantages in certain situations, in particular in the context of a point-to-point mode application of the M2M type.

The effectiveness of this known technique is limited by the fact that the radio communication terminal, after customisation, does not always use the best radio resources (also called carrier or frequency beacons in what follows) which are available at the location where it is located.

Indeed, the user chooses an operator without knowing exactly the network quality (PLMN) of this operator at the location where the terminal will subsequently be used.

In the worst of cases, the radio communication terminal, which has already been customised by a user in order to work with a given operator, can even be placed in a geographical cell that is not covered by this given operator.

In addition, most of the actors in the M2M market now desire that the transmission and reception of machine data be faster and more reliable. The selection and the use of the best carrier available are becoming as such critical.

Another disadvantage of this known technique resides in the fact that it does not allow a company that would like to install millions of terminals (for example embedded in water meters) to optimise the choice of the operator (i.e. of the network) for each terminal.

SUMMARY

An aspect of the disclosure relates to a method for customising a radio communication terminal for a definitive period or for a predetermined duration related to a subscription, the radio communication terminal possessing an operating mode requiring the association to said terminal of a customisation data set specific to a radio communication network, in order to allow for a link of said terminal with said radio communication network.

According to an embodiment of the invention, the method comprises the following steps, carried out a single time during a first use of said terminal:
  placing in an actual environment of use of said terminal, with no activated and definitive customisation data set being associated to said terminal;

obtaining carrier information pertaining to the carriers received by said terminal, each carrier being associated to a distinct geographical cell of a radio communication network:

selecting of a customisation data set for said terminal, from among a plurality of customisation data sets, according to at least one selection criterion applied to the carrier information obtained, said plurality of customisation data sets comprising at least one first customisation data set specific to a first radio communication network and at least one second customisation data set specific to a second radio communication network.

As such, an embodiment of the invention is based on an entirely new and inventive approach of the customisation of a radio communication terminal waiting for the attribution of an identity. Indeed, an embodiment of the invention is based on obtaining carrier information, which therefore does not require any particular manual action from the user.

An embodiment of the invention therefore consists in selecting the network in situ, instead of a choice of network (and therefore of operator) a priori.

Furthermore, an embodiment of the invention proposes to automate all or a portion of the customisation, by using the carrier information that is obtained by the radio communication terminal.

An embodiment of the invention provides advantageously to customise once and for all the radio communication terminal with a customisation data set, allowing it to use the best carrier which is available at the location where it is located.

An embodiment of the invention covers a first case wherein the selection of a customisation data set is made between customisation data sets specific to networks (of distinct types, for example GSM and UMTS) of the same operator.

An embodiment of the invention also covers a second case wherein the selection of a customisation data set is made between customisation data sets specific to networks of distinct operators.

Actual environment of use means any environment of use outside the factory.

Carrier information means any type of information carried by the carriers (for example over the SCH canal (for "Synchronisation Channel") (logical channel supported by the physical channel (on the slot no. 0) of the carrier)), for example power/quality information, network information (PLMN), etc.

According to an advantageous aspect of an embodiment of the invention, said at least one selection criterion belonging to the group comprising:

selection criteria based on a quality of the carriers received by the terminal; and selection criteria based on an order of preference of predetermined radio communication networks.

As such, it is possible to customise a radio communication terminal according to power measurements obtained for geographical cells in the vicinity of the one wherein is located the radio communication terminal.

Furthermore, it is provided advantageously to customise a radio communication terminal according to the preferences of the user, in terms of the type of network (GSM, UMTS, GPRS, etc.) and operator (for example, in France, SFR, Bouygues, etc.) to be used.

In a first particular embodiment of the invention, said steps of obtaining carrier information and of selecting a customisation data set are carried out by said terminal.

In this first particular embodiment, the decision of customisation is made by the radio communication terminal itself. The customisation of the radio communication terminal is therefore carried out without the intervention of a server. As such, it is not required to activate a customisation data set (IMSI, Ki) during the first use of the radio communication terminal, since the latter does not need to communicate with the server during the customisation.

In a preferred embodiment of the invention, the method comprises a step of releasing the customisation data set(s) other than the one selected.

The entity that implements an embodiment of this invention (for example an "MVNO" for "Mobile Virtual Network Operator") in order to customise a large number of terminals can limit the total number of required customisation data sets. Indeed, several customisation data sets are blocked in each terminal that has not yet been customised. But, as soon as this terminal has been customised, the customisation data sets that are not retained are released, in other words they again become available as possible customisation data sets for another terminal.

In an alternative of the preferred embodiment of the invention, said step of releasing comprises the following steps:

the terminal sends to a first server a message indicating the customisation data set selected for said terminal; and said first server releases the customisation data set(s) other than the one selected.

Advantageously, the method comprises a step of confirming or modifying the selection carried out by the terminal, comprising the following steps:

the terminal sends to a second server, whether or not confounded with the first server, a message indicating the customisation data set selected for said terminal; and said second server sends to the terminal a response confirming to it the selection carried out by the terminal, or requests that it replace the customisation data set selected for said terminal with another customisation data set.

In a preferred embodiment of the invention, the step of confirming or modifying the selection carried out by the terminal, further comprises the following steps:

the terminal sends to said second server said carrier information;

the second server selects said other customisation data set according to said carrier information; and the second server sends said other customisation data set to the terminal.

In a second particular embodiment of the invention, the method comprises a step of sending by the terminal to a third server of said carrier information. According to an embodiment of the invention, the third server carried out:

said step of obtaining carrier information, by receiving said carrier information;

said step of selecting a customisation data set; and a step of sending to the terminal of the customisation data set selected for said terminal.

In this second particular embodiment, the decision of customisation is made on the server. During the first switch-on of the radio communication terminal, the terminal transmits to the server carrier information, via a start-up communication. For this, the radio communication terminal uses at least one activated and non-definitive customisation data set, stored beforehand in the terminal. In this way, if a first data set does not make it possible to establish the start-up communication, then the terminal can attempt to open this communication with second, third, etc. data sets. The server carries out the selection of an activated and definitive customisation data set for the radio communication terminal, according to the carrier information. As such, all of the intelligence and logic for the selection are moved to the server, which makes an embodiment of the invention able to be operated for any type of radio communication terminal, with the latter not requiring any complex and costly adaptation in order to be compatible with the method according to an embodiment of the invention, which is particularly interesting.

Preferentially, said terminal comprises a SIM card. According to an embodiment of the invention, said customisation data is stored in said SIM card and/or in said terminal.

Advantageously, said customisation data includes at least one of said following elements:
    an identity number IMSI;
    an authentication key Ki; and
    an authentication algorithm.

Preferentially, said step of obtaining carrier information consists in obtaining carrier measurements, for each of at least two radio communication networks.

An embodiment of the invention also relates to a radio communication terminal possessing an operating mode requiring the association to said terminal of a customisation data set specific to a radio communication network, in order to allow for a link of said terminal with said radio communication network. According to an embodiment of the invention, the terminal comprises:
    means of obtaining carrier information, pertaining to carriers, each carrier being associated to a distinct geographical cell of a radio communication network;
    means of selecting a customisation data set from among a plurality of customisation data sets, according to at least one selection criterion applied to the carrier information obtained, said plurality of customisation data sets comprising at least one first customisation data set specific to a first radio communication network and at least one second customisation data set specific to a second radio communication network.

An embodiment of the invention also relates to a server for customising a radio communication terminal for a definitive period or for a predetermined duration related to a subscription, the radio communication terminal possessing an operating mode requiring the association to said terminal of a customisation data set specific to a radio communication network, in order to allow for a link of said terminal with said radio communication network. According to an embodiment of the invention, the server comprises:
    means of obtaining carrier information, pertaining to carriers, each carrier being associated to a distinct geographical cell of a radio communication network;
    means of selecting a customisation data set from among a plurality of customisation data sets, according to at least one selection criterion applied to the carrier information obtained, said plurality of customisation data sets comprising at least one first customisation data set specific to a first radio communication network and at least one second customisation data set specific to a second radio communication network.

An embodiment of the invention further relates to a SIM card of a radio communication terminal possessing an operating mode requiring the association to said terminal of a customisation data set specific to a radio communication network, in order to allow for a link of said terminal with said radio communication network. According to an embodiment of the invention, the SIM card comprises means of storing said customisation data.

An embodiment of the invention further relates to a computer programme product comprising programme code instructions for the execution of the steps of the aforementioned method, when said programme is executed on a computer.

An embodiment of the invention also relates to a means of storage, which may be totally or partially removable, that can be read by a computer, storing a set of instructions that can be executed by said computer in order to implement the aforementioned method.

BRIEF DESCRIPTION OF THE DRAWINGS

Other characteristics and advantages shall appear more clearly when reading the following description of a preferred embodiment, provided as a simple example for the purposes of illustration and in a non-exhaustive manner, and of the annexed drawings, among which.

DETAILED DESCRIPTION OF ILLUSTRATIVE EMBODIMENTS

An embodiment of the invention aims therefore to provide a technique for a radio communication terminal waiting for the attribution of an identity, for a definitive period or for a predetermined duration related to a subscription of.

As already indicated, this customisation has for objective to allow for a link between the radio communication terminal and a public land network of an operator (PLMN).

The customisation according to an embodiment of the invention is carried out a single time during a first use of the radio communication terminal in an actual environment of use, i.e. in a context of use outside the factory.

The general principle of an embodiment of the invention is based on a technique of selecting a customisation data set, making it possible for the radio communication terminal to use the best network (in the sense of predetermined criteria) available for the geographical cell wherein the terminal is positioned during the implementation of the customisation according to an embodiment of the invention.

In order to simplify the description, we shall limit ourselves, in the rest of this document, to describing the particular case of the customisation of a radio GSM communication terminal embedded in a water meter. After customisation (i.e. after the activation of a customisation data set in the radio communication terminal), the water meter can for example transmit consumption data of one or several users to apiece of remote control equipment, via the GSM network. In this embodiment, the water meter is provided to be positioned definitively at a location, for example in the basement of a building. Of course, one or more embodiments of the invention apply to any other type of radio communication terminal, in particular, but not exclusively, to mobile radio communication terminals (radio telephone, PDA, etc.).

It is important to note that, in a first particular embodiment, all of the customisation data sets are stored (in a non-encrypted or in an encrypted form) in the terminal. In an alternative embodiment, all of the customisation data sets are stored in a SIM card. In another alternative embodiment, some sets are stored in the terminal and others in the SIM card.

In the rest of this document, it is supposed that the user has already inserted into the radio communication terminal a SIM card according to an embodiment of the invention which comprises a plurality of customisation data sets. In a particular embodiment, the SIM card of an embodiment of the invention comprises two customisation data sets, a first set of data (noted as IMSI 1, Ki 1) specific to a first public land network of a first operator (for example the GSM network of the operator SFR) and a second set of data (noted as IMSI 2, Ki 2) specific to a second public land network of a second operator (for example the UMTS network of the operator Bouygues).

Figure 1:
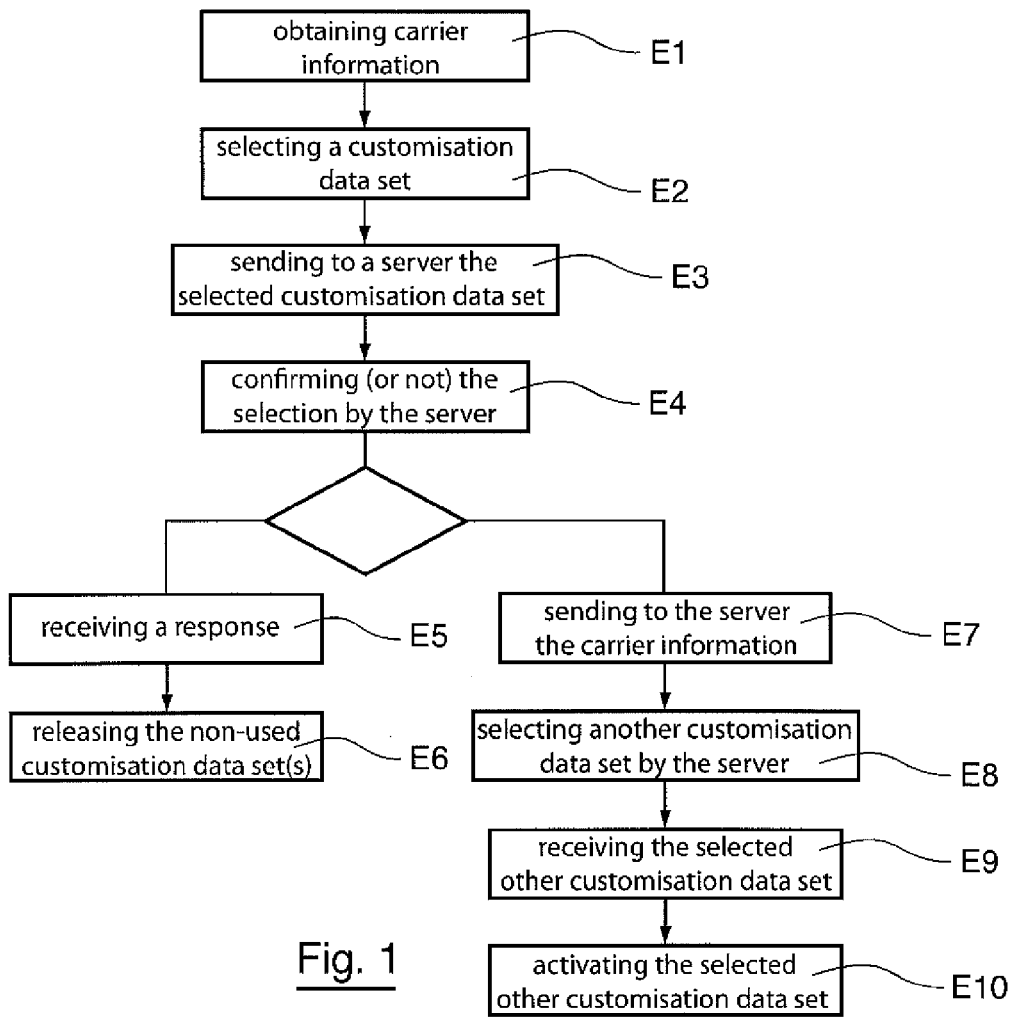
FIG. 1 shows a flow chart showing a particular embodiment of the method according to the invention, in the case where the selection of the customisation data set is carried out by a radio communication terminal.

In relation with FIG. 1, un flow chart is now presented showing a particular embodiment of the method according to the invention, in the case where the selection of the customisation data set (IMSI, Ki) is carried out by the radio communication terminal.

Conventionally, the radio communication terminal, which is positioned in a given geographical cell, receives the carriers of this given cell and of the geographical cells in the vicinity.

During a first step E1, the radio communication terminal obtains power information (also called carrier information in what follows) pertaining to the carries received, by means of a network scan. In a particular embodiment, the power information is obtained by the execution by the radio communication terminal of AT commands. Such AT commands are presented in detail in standardisation document 3GPP TS 07.07.

By way of example, the command "AT+COPS=?" makes it possible to obtain a list of networks (PLMN) that are visible by the radio communication terminal (as such a list PLMN identifiers is thus obtained).

Moreover, a command is used making it possible to obtain a current list of cells (wherein the terminal is located) and in the vicinity (up to 6 cells) with, for each cell, a measurement of the level (the command "AT+CCED=0" is used for example, this command is proposed by the company WAVECOM). Note that this AT command only polls the neighbouring cells of the same operator. According to an embodiment of the invention, the radio communication terminal must obtain power measurements for the neighbouring cells of distinct operators. For this, a new command is designed for example by changing the aforementioned command AT+CCED, so that it polls the measurements of the most powerful cell on each of the visible operators, without attempting each time to register itself thereon.

During a step E2, the radio communication terminal selects a customisation data set, from among the two customisation data sets of the aforementioned example, according to a selection criterion applied to the carrier information obtained in the step E1.

In this embodiment, the selection criterion is a criterion based on the quality or the power of the carriers received by the terminal. As such, the most powerful carrier can be chosen for the terminal.

In an alternative embodiment, the selection criterion is a criterion based on an order of preference of radio communication networks. The user can therefore stipulate, for example, that he wants to work with the operator SFR rather than with the operator Bouygues.

In another alternative embodiment, the selection criterion is a combination of two criteria, with a first criterion based on the quality or the power of the carriers received by the terminal and a second criterion based on an order of preference of radio communication networks. By way of example, the following criterion can be considered: if the difference in reception power level between a first operator and a second operator is less than 10 dBm, then the second operator is chosen, otherwise the first operator is chosen.

It is important to note that at the end of this step E2, the selected customisation data set is activated. In our example, the first data set IMSI 1, Ki 1 (associated to the GSM network of the operator SFR) is selected. The radio communication terminal is as such customised and can thus communicate with the remote control equipment, via the GSM network of the operator SFR.

During a step E3, the radio communication terminal sends to a server of the network a message indicating the customisation data set selected in the step E2 (i.e. the first data set IMSI 1, Ki 1, in the aforementioned example).

During a step E4, the server of the network confirms or does not confirm the selection carried out by the terminal in the step E2. In the event of a positive confirmation, control passes to a step E5, otherwise control passes to a step E7.

During a step E5, the server of the network sends to the radio communication terminal a response confirming to it the selection carried out (step E2).

During a final step E6, the server of the network releases the customisation data set(s) other than the one selected (step E2). In our example, the server of the network releases the second data set IMSI 2 (associated to the UMTS network of the operator Bouygues).

During the step E7, the radio communication terminal sends to the server of the network the carrier information obtained in the step E1.

During a step E8, the server of the network selects another customisation data set (from among the two aforementioned customisation data sets), according to the carrier information received.

Then, during a step E9, the server of the network sends the other customisation data set selected (step E8) (i.e. the second data set IMSI 2, Ki 2, in the aforementioned example) to the radio communication terminal.

Finally, during a step E10, the radio communication terminal activates the other customisation data set selected (step E8). The radio communication terminal is therefore customised and can as such communicate with the UMTS network of the operator Bouygues.

Figure 2:
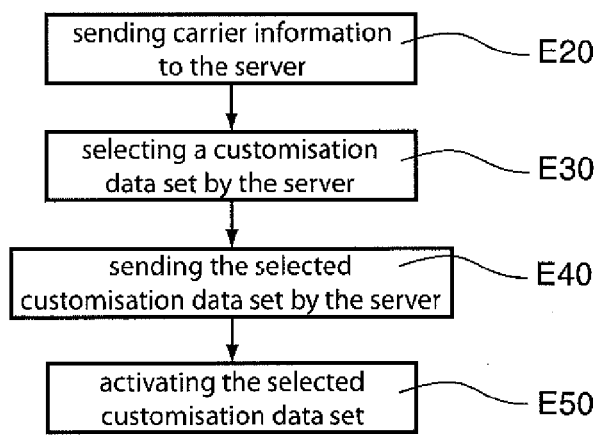
FIG. 2 shows a flow chart showing a particular embodiment of the method according to the invention, in the case where the selection of customisation data set is carried out on a server.

In relation with FIG. 2, a flow chart is presented showing a particular embodiment of the method according to the invention, in the case where the selection of the customisation data set (IMSI, Ki) is carried out on the server of the network.

As already indicated, the radio communication terminal, which is positioned in a given geographical cell, receives carriers from the different geographical cells, for the operators that are visible at this location.

During a first step E20, the radio communication terminal sends to the server of the network power information (also called carrier information) pertaining to the carriers received by the terminal, by a scanning of the network.

During a step E30, the server of the network selects a customisation data set, from among the two customisation data sets of the aforementioned example, according to a selection criterion applied to the carrier information received in the step E20. In our example, the server of the network selects the first data set IMSI 1, Ki 1 (associated with the GSM network of the operator SFR).

Then, during a step E40, the server of the network sends the customisation data set selected in the step E30 (i.e. the first data set IMSI 1, Ki 1) to the radio communication terminal.

Finally, during a step E50, the radio communication terminal activates the first data set IMSI 1, Ki 1. The radio communication terminal is therefore customised and can as such communicate with the GSM network of the operator SFR.

Figure 3:
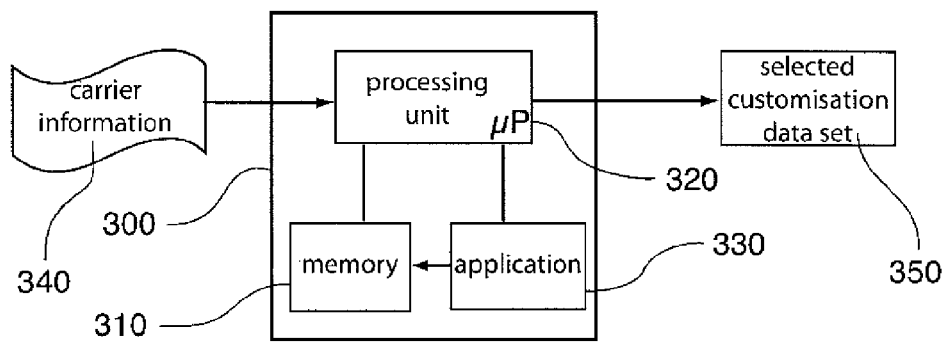
FIG. 3 shows the simplified structure of a particular embodiment of a radio communication terminal according to the invention.

FIG. 3 shows schematically the structure of a radio communication terminal 300 according to an embodiment of the invention, which comprises a memory 310, and a processing unit 320 equipped with a microprocessor µP, which is driven by a computer programme (or application) 330 implementing certain steps of the method described in FIGS. 1 and 2. The processing unit 320 receives as input carrier information 340. The microprocessor µP processes this information, according to the instructions of the programme 330, in order to obtain a customisation data set 350 (selected from among a plurality of customisation data sets).

Figure 4:
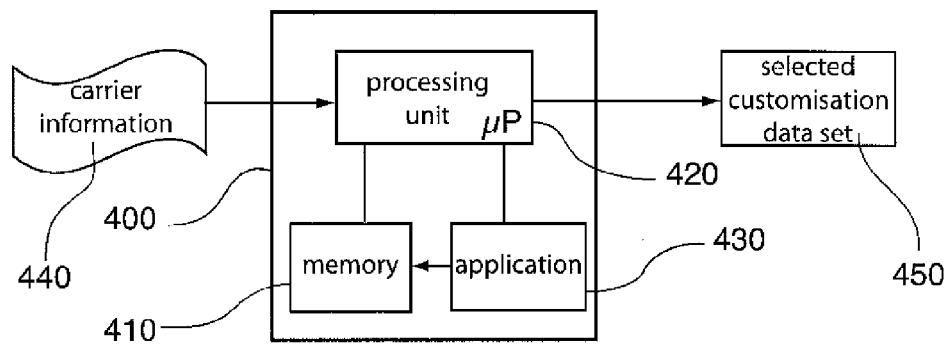
FIG. 4 shows the simplified structure of a particular embodiment of a server according to the invention.

FIG. 4 shows schematically the structure of a server 400 according to an embodiment of the invention, which comprises a memory 410, and a processing unit 420 equipped with a microprocessor µP, which is driven by a computer programme (or application) 430 implementing certain steps of the method described in FIGS. 1 and 2. The processing unit 420 receives as input carrier information 440 (transmitted by the radio communication terminal 300). The microprocessor µP processes this information, according to the instructions of the programme 430, in order to obtain a customisation data set 450 (selected from among a plurality of customisation data sets, then sent to the radio communication terminal 300).

At least one embodiment of the disclosure provides a technique for the customisation of a radio communication terminal that is simple and effective to implement, in particular in terms of the radio resources used.

At least embodiment provides such a technique that allows a user to activate the customisation of a radio communication terminal, during its first use and definitively or for a predetermined duration related to a subscription.

At least one embodiment provides such a technique that is ergonomic and that suppresses, or at the very least limits, the manual key-entry operations that must be carried out by the user.

At least one embodiment proposes such a technique that is in particular well adapted to the definitive customisation for a predetermined duration related to a subscription of a large number of radio communication terminals implemented in point-to-point mode applications of the M2M type.

At least one embodiment also provides such a technique that is not costly and that is compatible with all the existing communication terminals.

Although the present disclosure has been described with reference to one or more examples, workers skilled in the art will recognize that changes may be made in form and detail without departing from the scope of the disclosure and/or the appended claims.

The invention claimed is:

1. A method for customising a terminal for a definitive period or for a predetermined duration related to a subscription, said method comprising:
 selecting a customisation data set for said terminal, from among a plurality of customisation data sets, each of the plurality of customisation data sets being specific to a different Public Land Mobile Network (PLMN), and each of the plurality of customisation data sets including at least one of said following elements: an International Mobile Subscriber Identity number (IMSI), an authentication key Ki and an authentication algorithm,
 activating the selected customisation data set, in order to allow for a link of said terminal with a PLMN to which the selected customisation data set is specific,
 wherein the method comprises the following steps, carried out a single time during a first use of said terminal:
  placing in an actual environment of use of said terminal, with no customisation data set selected and activated for said terminal; and
  after placing the terminal in the actual environment of use, obtaining carrier information pertaining to carriers received by said terminal from a network scan, each carrier being associated to a distinct PLMN geographical cell;
  wherein said step of selecting is carried out after obtaining the carrier information, and according to at least one selection criterion applied to the carrier information obtained and said steps of obtaining carrier information and selecting a customisation data set are carried out by said terminal; and
 wherein the method comprises a step of confirming or not confirming the selection carried out by the terminal, comprising the following steps:
  the terminal sends to a server a message indicating the customisation data set selected for said terminal; and
  when said server confirms the selection carried out by the terminal said server sends to the terminal a response that confirms to the terminal the selection carried out by the terminal, and when the server does not confirm the selection carried out by the terminal said server sends to the terminal a response that requests that the terminal replace the customisation data set selected for said terminal with another customisation data set.

2. The method set forth in claim 1, wherein said selection criterion belongs to the group comprising:
 selection criteria based on a quality of carriers received by the terminal; and
 selection criteria based on an order of preference of predetermined PLMNs.

3. The method set forth in claim 1, wherein the method comprises a step of releasing other customisation data set(s) other than the one selected.

4. The method set forth in claim 3, wherein said step of releasing comprises the following steps:
 the terminal sends to a server a message indicating the customisation data set selected for said terminal; and
 said server releases the other customisation data set(s) other than the one selected.

5. The method set forth in claim 1, wherein the step of confirming or modifying the selection carried out by the terminal, further comprises the following steps:
 the terminal sends to said server said carrier information;
 the server selects said another customisation data set according to said carrier information; and
 the server sends said another customisation data set to the terminal.

6. The method as set forth in claim 1, wherein said terminal comprises a SIM card, and said customisation data is stored in at least one of said SIM card or said terminal.

7. The method as set forth in claim 1 wherein said step of obtaining carrier information comprises obtaining carrier measurements for each of at least two PLMNs.

8. A terminal comprising:
 a memory comprising instructions stored thereon;
 a processor coupled to the memory and configured by the instructions to perform steps of:
  obtaining carrier information pertaining to carriers received by said terminal from a network scan after placing the terminal in an actual environment of use, each carrier being associated to a distinct Public Land Mobile Network (PLMN) geographical cell;

selecting, according to at least one selection criterion applied to the carrier information obtained, a customisation data set for said terminal from among a plurality of customisation data sets, each of the plurality of customisation data sets being specific to a different PLMN, and each of the plurality of customisation data sets including at least one of said following elements: an International Mobile Subscriber Identity number (IMSI), an authentication key Ki and an authentication algorithm;

activating the selected customisation data set, in order to allow for a link of said terminal with a PLMN to which the selected customisation data set is specific;

carrying out the following steps a single time during a first use of said terminal:

placing in an actual environment of use of said terminal, with no customisation data set selected and activated for said terminal; and after placing the terminal in the actual environment of use, obtaining carrier information pertaining to carriers received by said terminal from a network scan, each carrier being associated to a distinct PLMN geographical cell;

wherein said step of selecting is carried out after obtaining the carrier information, and according to at least one selection criterion applied to the carrier information obtained and said steps of obtaining carrier information and selecting a customisation data set are carried out by said terminal; and confirming or not confirming the selection carried out by the terminal, comprising the following steps:

the terminal sends to a server a message indicating the customisation data set selected for said terminal; and when said server confirms the selection carried out by the terminal said server sends to the terminal a response that confirms to the terminal the selection carried out by the terminal, and when the server does not confirm the selection carried out by the terminal said server sends to the terminal a response that requests that the terminal replace the customisation data set selected for said terminal with another customisation data set.

9. A computer-readable storage device that can be read by a computer, storing a set of instructions that can be executed by said computer in order to implement a method for customising a terminal for a definitive period or for a predetermined duration related to a subscription, said method comprising:

selecting a customisation data set for said terminal, from among a plurality of customisation data sets, each of the plurality of customisation data sets being specific to a different Public Land Mobile Network (PLMN), and each of the plurality of customisation data sets including at least one of said following elements: an International Mobile Subscriber Identity number (IMSI), an authentication key Ki and an authentication algorithm, activating the selected customisation data set, in order to allow for a link of said terminal with a PLMN to which the selected customisation data set is specific, the following steps, carried out a single time during a first use of said terminal:

placing in an actual environment of use of said terminal, with no customisation data set selected and activated for said terminal; and after placing the terminal in the actual environment of use, obtaining carrier information pertaining to carriers received by said terminal from a network scan, each carrier being associated to a distinct PLMN geographical cell;

wherein said step of selecting is carried out after obtaining the carrier information, and according to at least one selection criterion applied to the carrier information obtained and said steps of obtaining carrier information and selecting a customisation data set are carried out by said terminal; and a step of confirming or not confirming the selection carried out by the terminal, comprising the following steps:

the terminal sends to a server a message indicating the customisation data set selected for said terminal; and when said server confirms the selection carried out by the terminal said server sends to the terminal a response that confirms to the terminal the selection carried out by the terminal, and when the server does not confirm the selection carried out by the terminal said server sends to the terminal a response that requests that the terminal replace the customisation data set selected for said terminal with another customisation data set.

* * * * *

UNITED STATES PATENT AND TRADEMARK OFFICE
CERTIFICATE OF CORRECTION

PATENT NO. : 8,644,825 B2  Page 1 of 1
APPLICATION NO. : 12/375965
DATED : February 4, 2014
INVENTOR(S) : Montes et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1359 days.

Signed and Sealed this
Twenty-ninth Day of September, 2015

Michelle K. Lee
*Director of the United States Patent and Trademark Office*